United States Patent Office 2,800,097
Patented July 23, 1957

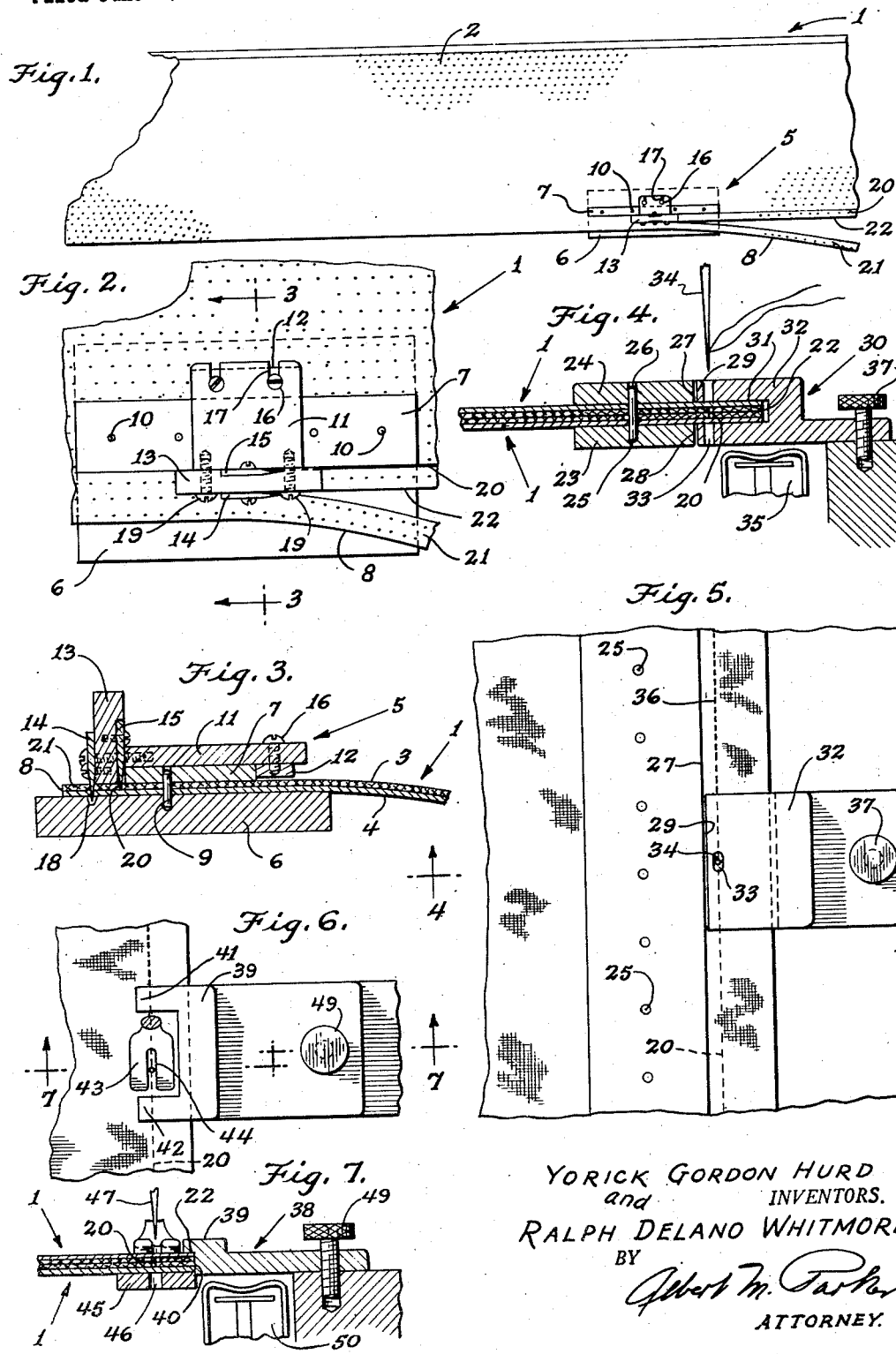

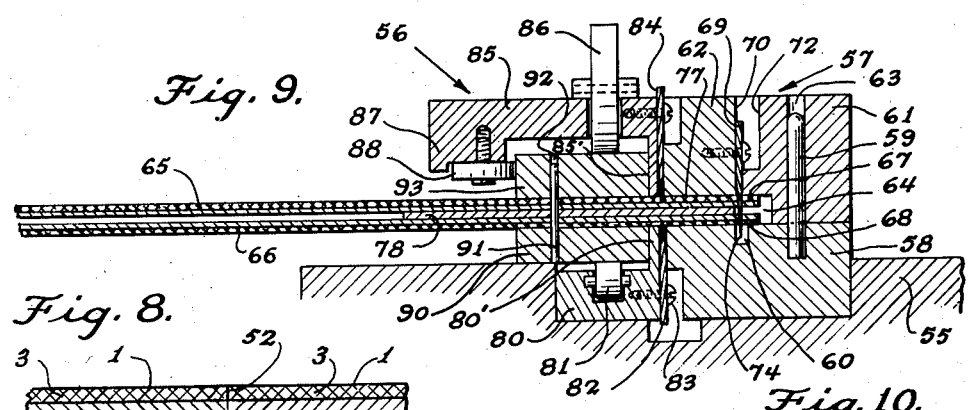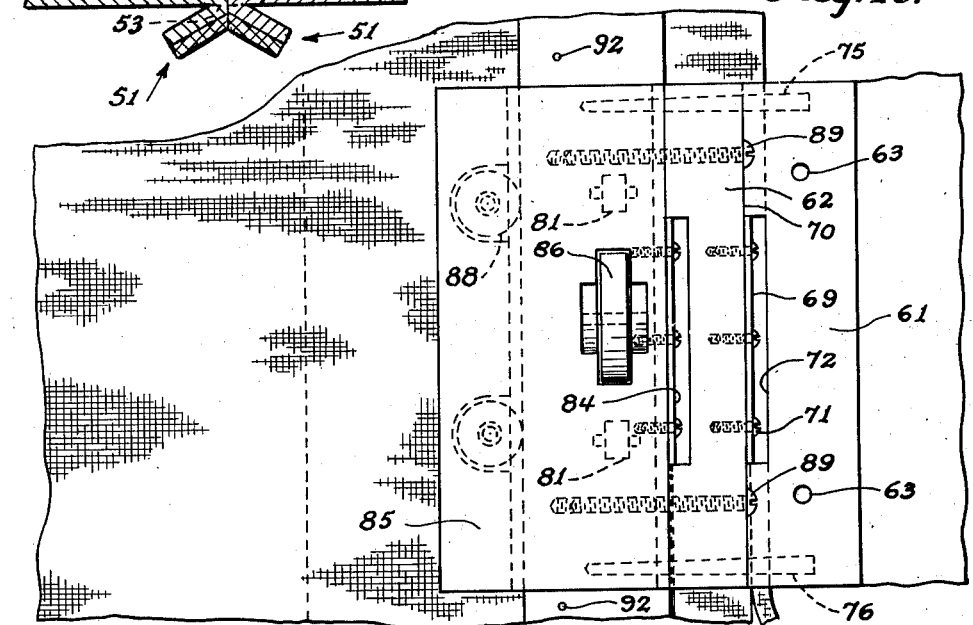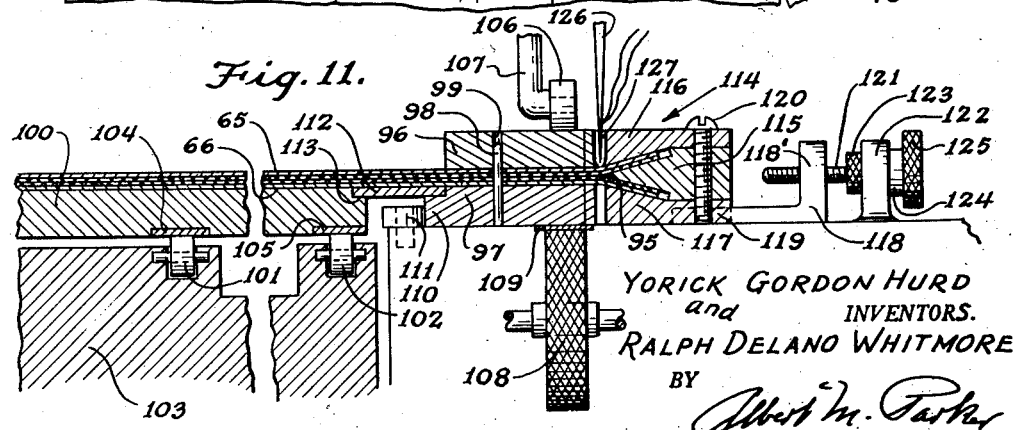

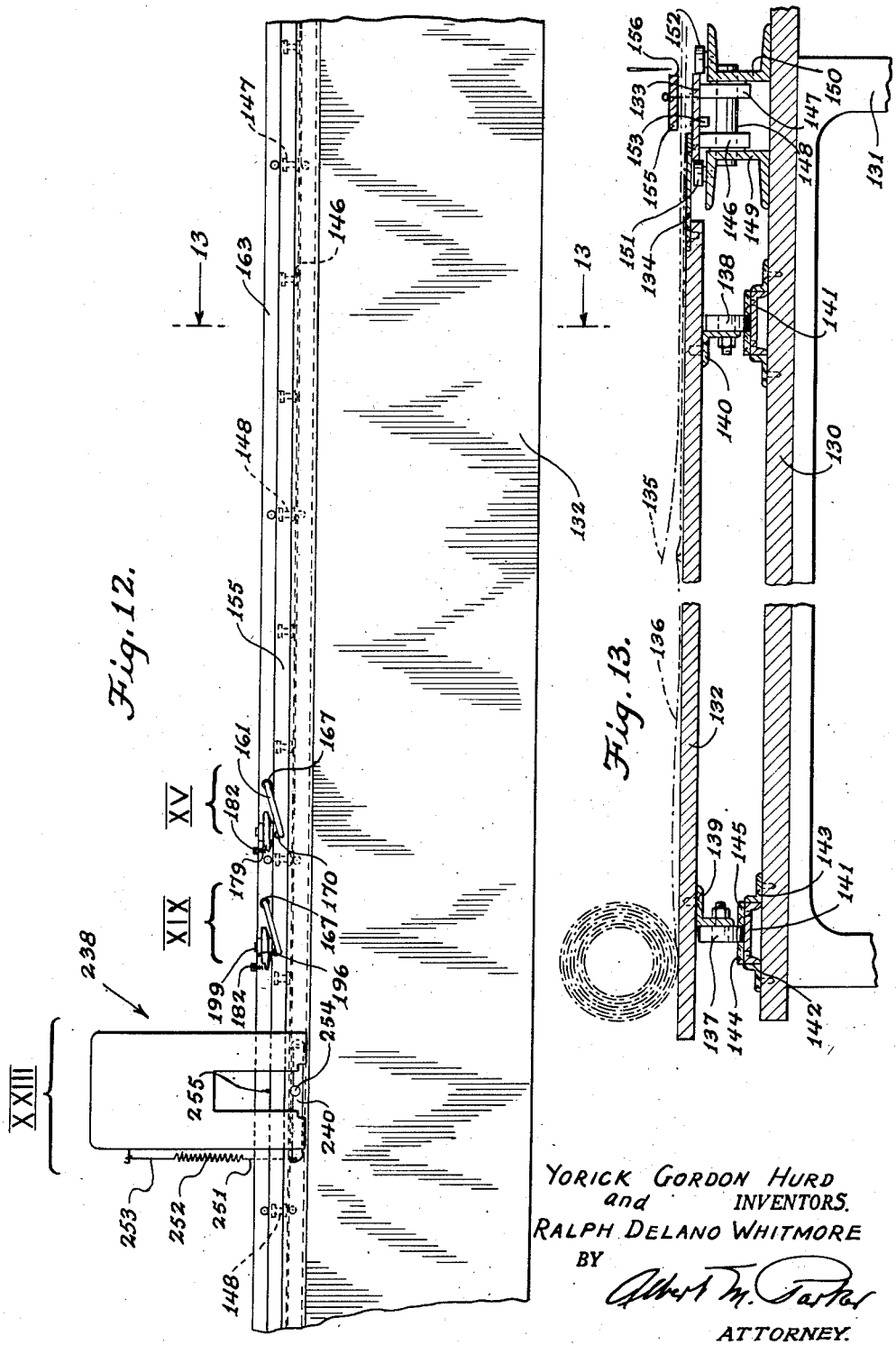

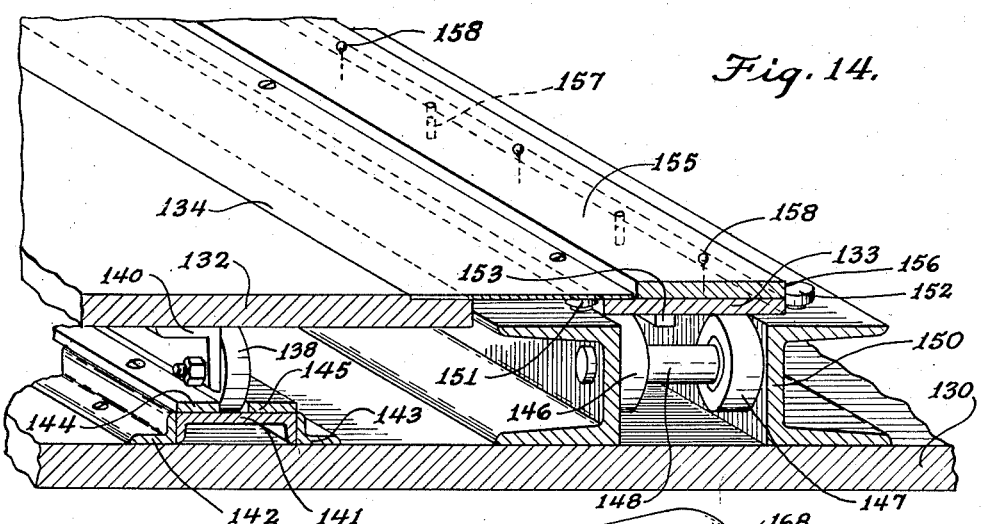

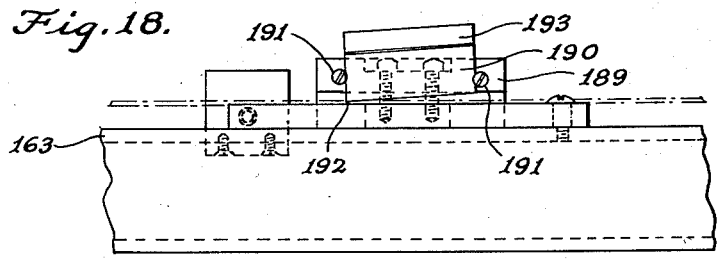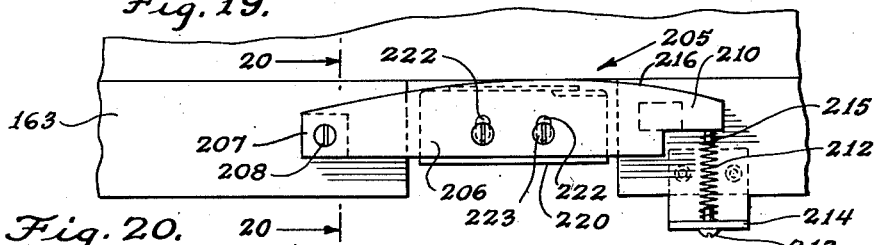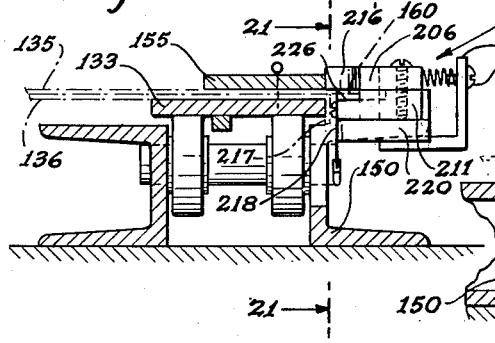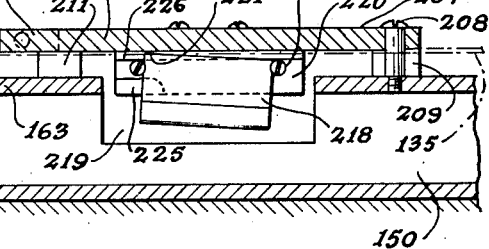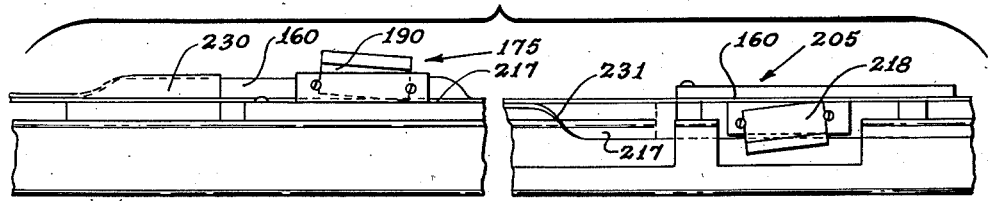

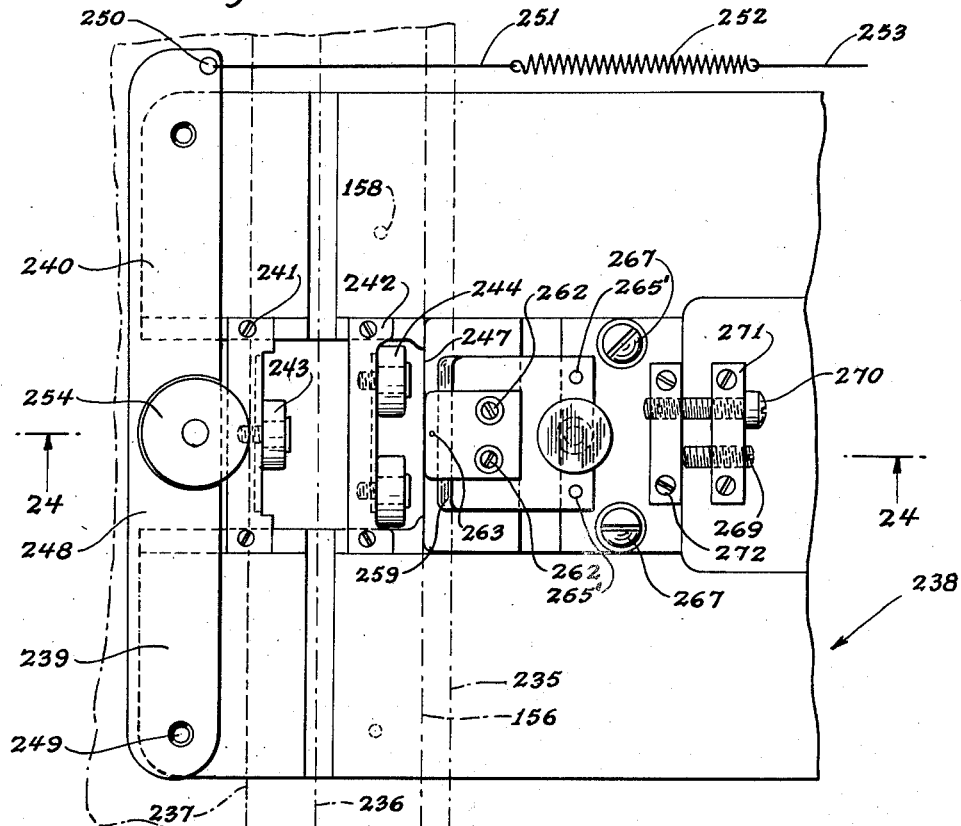
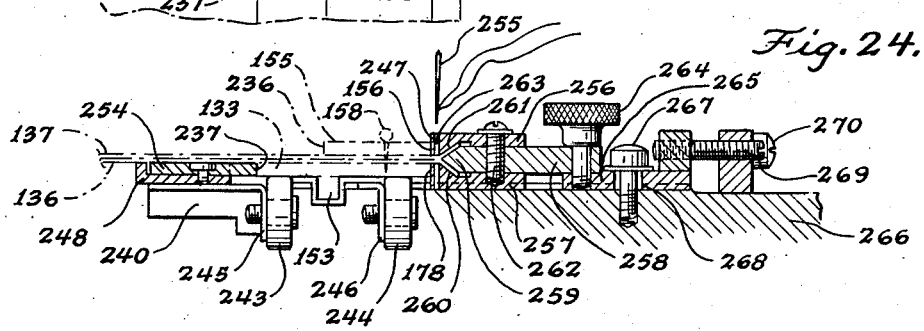

2,800,097

METHODS AND APPARATUS FOR FORMING ARTICULATED SHEET MATERIAL

Yorick Gordon Hurd, Laurelton, and Ralph Delano Whitmore, New York, N. Y., assignors to Twentieth Century Fox Film Corporation, New York, N. Y., a corporation of New York Application June 5, 1951, Serial No. 229,904

28 Claims. (Cl. 112—122)

This invention relates to methods and apparatus for the forming of articulated sheet material and is particularly concerned with the joining of strips of laminated sheet material and the preparing of them prior to said joining in such a manner that the joining will effect substantially unnoticeable seams between the strips.

In the co-pending application of Yorick G. Hurd and Herbert E. Bragg, Serial No. 189,006, the articulated sheet material itself is described and claimed, as well as certain methods for forming the same. The instant invention is concerned with improvements and amplification in said methods and with apparatus for use in preparing and joining strips of the materials to form sheets or screens of the type described in application Serial No. 189,006, now Patent No. 2,683,679.

The handling and working on long and relatively wide strips of cloth-like sheet material is normally somewhat difficult when no special operations are involved. Where such strips, to be subsequently joined together, must be severed to a precise uniform depth along a line extending the full length of each strip, and where that must be done in exact relationship to a reference line, very special handling is necessary. Additional difficulty is involved when two such strips are to be brought together with their lines of severance in exact opposition throughout the entire length of the strips. This is particularly true when the operation is to be carried out on a fully commercial basis.

It is accordingly an object of the invention to provide methods and apparatus for the elongated severing of a portion of the thickness of laminated sheet material in exact relationship to a reference line.

Another object is to provide for such severing to a uniform depth.

A more detailed object is to provide such methods and apparatus for the exact severing of one or more of the laminations of such material.

A further object is to provide for the partial severing of two sheets of such material in relation to the same reference line.

The locating of two strips of such sheet material so severed and the maintaining of them in fixed relationship with their lines of severance in exact opposition, while joining them through their base portions in back of their severed portions, also presents many problems. This is particularly true when the severing is in the form of a fine knife cut of uniform depth and the purpose of the securing is to assure the provision of a substantially unnoticeable seam or joint on the front face of the composite sheet. This invention contemplates the doing of those things on a commercial basis in a fool-proof manner, so that large articulated sheets, such as moving picture screens, may be quickly, simply and economically formed without waste of material.

It is accordingly another object of the invention to provide methods and apparatus for the exact registration of the lines of severance of strips of partially severed sheet material throughout a substantial length.

Another object is to provide methods and apparatus for effecting such registration with the severed faces of the sheets in engagement.

A further object is to provide methods and apparatus for the securing of such severed strips of sheet material together solely through the portions of material remaining in back of the lines of severance and while said strips are maintained with their lines of severance in exact opposition.

Preferably, the locating, slitting or severing, and securing of the sheets should all be effected as a continuous operation. This is so in order to expedite and simplify the handling of the sheet material and to prevent any departure of the lines of severance from exact registration. This introduces difficulties in connection with the slitting or severing, since the slits must be made in the faces of the strips opposed to each other. These difficulties are, however, overcome by the method and apparatus of the instant invention.

It is, accordingly, a further object of the invention to provide methods and apparatus for the aligned slitting, or partial severing, of opposed strips of sheet material with the slits extending inward from the opposed faces of such strips for a portion of their thickness.

A further object is to provide methods and apparatus for effecting such partial severing while the strips of material are maintained in registry.

A still further object is to provide methods and apparatus for securing such opposed and slitted strips of material together, all as part of a continuous operation commencing with the severing.

A more detailed combined object is to locate two strips of laminated motion picture screen material in face to face relation and in registry for the securing of them together adjacent an edge of each in order to form a larger sheet; effecting relative movement of the registered strips with respect to stations where the strips are severed part way through from the inner surfaces outwardly with their lines of severance in exact opposition; effecting relative movement of such registered and severed strips with respect to a sewing station, where the material of the strips remaining in back of the severed portions is tightly sewn together, and hinging the joined strips outwardly about the line of joinder into a flat plane to provide an articulated sheet having substantially unnoticeable seams or joints on one face thereof between the strips thereof.

Further and more detailed objects of the invention will in part be obvious and in part be pointed out as the description of the illustrative embodiments of the method and apparatus depicted in the accompanying drawing proceeds.

In that drawing:

Figure 1 is a plan view of a fragment of a strip of sheet material illustrating a method and apparatus for trimming the edge of said strip and slitting or cutting into a face of the same at a position slightly inwardly from the trimmed edge.

Figure 2 is a greatly enlarged showing of the slitting device of Figure 1 as applied to a fragment of the strip material.

Figure 3 is a vertical section taken on line 3—3 of Figure 2 looking in direction of the arrows.

Figure 4 is a vertical section of apparatus employed for the registering of two severed strips ready to be secured together with their severed portions in alignment with each other and with the securing means.

Figure 5 is a plan view of the apparatus and material as shown in Figure 4.

Figure 6 is a view similar to Figure 5 of a somewhat modified form of apparatus.

Figure 7 is a vertical section taken on line 7—7 of Figure 6 looking in the direction of the arrows.

Figure 8 is an enlarged fragmentary section of two strips of laminated material joined together in acocrdance with the invention looking along the line of joinder.

Figure 9 is a vertical section of apparatus for the partial severing and edge trimming of two strips of material simultaneously while said strips are maintained in registry.

Figure 10 is a plan view of the apparatus and material shown in Figure 9.

Figure 11 is a vertical section of an improved form of securing apparatus for the registering and securing together of partially severed strips as reversed upon each other following the severing of Figure 9.

Figure 12 is a top plan view, somewhat diagrammatic, illustrating the preferred form of combined apparatus for the severing and securing of opposed strips of material.

Figure 13 is an enlarged vertical detailed section taken on line 13—13 of Figure 12 and looking in the direction of the arrows.

Figure 14 is an enlarged fragmentary perspective view of a portion of the apparatus of Figure 12 as viewed from the right hand end thereof and illustrating the movable table mounting of the apparatus.

Figure 15 is an enlarged fragmentary perspective view of that portion of the Figure 12 apparatus shown at position XV on Figure 12, and illustrating the lower strip cutter and the hold-down device at that position.

Figure 16 is a fragmentary plan view of the cutter device of Figure 15 per se.

Figure 17 is a vertical section looking to the right and taken through the middle of the cutter mounting of Figure 15.

Figure 18 is a vertical section on line 18—18 of Figure 17 and looking in the direction of the arrows.

Figure 19 is an enlarged fragmentary top plan view of the mounting for the upper strip cutter employed at position XIX in Figure 12.

Figure 20 is a vertical section taken on the line 20—20 of Figure 19 and looking in the direction of the arrows.

Figure 21 is a vertical section on line 21—21 of Figure 20 and looking in the direction of the arrows.

Figure 22 is a fragmentary elevation of a portion of the apparatus of Figure 12 as viewed from the rear in Figure 12.

Figure 23 is a top plan view of the portion of the combined apparatus of Figure 12 at the position marked XXIII thereon.

Figure 24 is a vertical section taken on line 24—24 of Figure 23 and looking in the direction of the arrows.

In the aforementioned application Serial No. 189,006, the product was, for the sake of simplicity, considered from the point of view of its applicability to motion picture screens. It was also pointed out there that the invention was equally applicable to all optical projection screens, and other screen or sheet-like material where the formation of substantially unnoticeable seams between strips, or panels, is desired. The description herein will proceed on the same basis, i. e., for the sake of simplicity, the method and apparatus about to be described in detail will, for the sake of illustration, be considered as being employed in the forming of sheets of material for use in motion picture screens.

An apparatus and method for trimming the edge and severing a portion of the thickness of one strip of screen material at a time is shown in Figures 1–3. Here, a strip of screen material of the perforated type is shown at 1, with the perforations being illustrated at 2. The perforations 2 in this type of material are made in a definite parallel row pattern, so as to establish definite reference lines for use in working on the material. From Figure 3 it is seen that the screen material 1 is of a two-ply, or two-lamination, type with the laminations 3 and 4 being shown as of substantially the same thickness. It is of course to be understood that screen material of dissimilar lamination thicknesses could be employed as also could material of more than two laminations.

The trimming and slitting device indicated generally at 5 employs a base 6 which underlies the strip of material adjacent its edge and extends out to some extent from that edge. The length of the base 6, and in fact the full length of the whole of the device, as here shown, is quite small in relation to the length of the strip of material to be trimmed and severed. It is to be understood, however, that the device and particularly its base 6 and guiding plate 7 could be made of greater length. In fact, the base and guide plate could be made the whole length of the section of material if desired.

A portion of the strip 1 adjacent its edge is seated on the base 6 while part of the base extends outwardly beyond the edge of the strip. The guide plate 7 seats on top of the strip of material in parallel relationship with respect to the base 6, but is inwardly spaced from the initial edge 8 of the material to a sufficient extent to enable trimming and slitting to be effectively carried on. The definite parallel relationship between the base 6 and the guide 7 is effected by means of pins 9 carried by the base 6. These pins extend up through certain of the perforations in the strip 1 into suitable receiving openings 10 in the guide plate 7. Thus, the trimming of the edge of the strip and the severing of its upper lamination is effected in definite relationship with respect to the perforations receiving the pins 9. Accordingly, the strip material can be subsequently accurately relocated by registering such a set of pins with the same or parallel perforations.

The actual trimming and slitting device is slidably mounted on the guide plate 7 and brides over it by means of the body part 11, whose inner end is provided with a guiding cleat 12 and whose outer end carries a cutter block 13. The block 13 in turn carries the trimming and slitting knives 14 and 15 respectively. The guiding cleat 12 underlies the body 11 and is adjustably secured thereto by means of screws 16 received in slots 17. The cleat 12 locates the trimming and slitting device by sliding on the inner edge of the guide plate 7. Thus, the adjustable relationship of the cleat 12 and body 11 provides for the taking up of any slack existing between the trimming and slitting device and the bar 7 crosswise of the bar 7.

Accurate trimming of the edge of the section of material is effected by means of the knife 14, which is suitably removably secured to the outer face of the block 13. The knife 14 when in cutting position, as shown in Figure 3, extends downward all the way through the material being trimmed and has its cutting edge received in a slot 18, in the base 6.

The slitting knife 15 is received in a recess formed in the rear face of the block 13 and is removably secured therein by means of a screw, or suitable means. This knife blade, like the blade 14, is generally centrally located with respect to the the width of the block 13 and lies between the screws 19 which secure the block 13 to the front edge of the body 11. The block 13 extends somewhat beyond the screws 19 in order to provide adequate guiding contact with the outer edge face of the guiding strip 7.

The knife 15 is set to the depth required to merely cut through the desired lamination of the strip of material and no further. This cut forms a slit which can be subsequently opened up by bending the unsevered material of the strip remaining behind it. This cut is shown at 20, while the discarded portion of the section of material being cut off is indicated at 21, and the newly finished edge of the strip is shown at 22.

To prepare a strip, in accordance with this form of the invention, ready for securing to a counterpart of it, the strip is placed on the base 6 with its original edge 8 lying inside of the outer edge of that base, as seen in Figure 3. This placing is done in such a manner that the row of pins 9 extend up through certain of the exactly aligned perforations 2 in the pre-selected row thereof. The guide plate 7 is then located on top of the strip with its perforations 10 receiving the upper ends of the pins 9. Next, the trimming and slitting device, with its knives properly secured in place on the cutting block 13, is seated on the guide plate 7 with the rear cleat 12 engaging the rear edge of the guide plate and the knife block 13, except when the same is recessed to take the knife 15, engaging the front edge of the plate 7. Exact straight line slitting and trimming are required, as will appear hereinafter, so movement of the cutting device must be limited to sliding along the plate 7. Any transverse play between the trimming and slitting device and the plate 7 is taken up by adjusting the position of the cleat 12. This is done by the adjustable positioning of the screws 16 in the slots 17.

In operation, the trimming and slitting device, when properly seated, is slid along the plate 7 to trim off the edge portion 21 to form an exact new outer edge 22. At the same time, the slitting knife 15 forms a straight slit 20 down through the preselected thickness of the strip 1. That slit is not only exactly parallel to the edge 22, but it is also parallel to the line through the row of perforations with which the pins 9 are registered. Thus, the slit 20 besides being straight and true in and of itself, also bears exact relationship to two different reference markers, i. e., the edge 22 and the line through the row of perforations engaged by the pins 9.

In order to completely trim and slit along one edge of a strip using the trimming and slitting device as shown in Figures 1–3, it will be understood that the device is first located in an initial position adjacent one end of the strip using perforations from a row for registry purposes. Once the trimmer and slitter has traveled the length of the base 6 and guide plate 7, the latter are removed from the sheet and moved along the row of perforations to the position for the next cut. There they are lined up by inserting the pins 9 in further perforations along the same row and engaging the apertures 10 in the plate 7 with the extending portions of the pins 9. The necessity for moving the device along could, of course, be eliminated by extending the base 6 and the guide plate 7 for the full length of the strip of material. That would indeed be preferable when any substantial amount of work is to be done.

To form a substantially unnoticeable joint between adjacent strips of laminated sheet material, it is necessary that the two strips to be joined must be capable of being registered so that the slits therein can be seated in exact opposition to each other. This is effected, as shown in Figure 4, by placing the two strips 1 with their slit faces against each other and aligning them by means of suitable aligning pins, passing through the same row of perforations as employed during slitting of a row parallel thereto. Thus, the slits will mate with each other. When two sheets are placed in face to face relation and are so held with their slits aligned they are ready for the performing of the next, or securing, step of the method.

As shown in Figure 4, the two strips are first engaged using their finished edges 22 to line them up initially and then they are related exactly by means of the guide plates 23 and 24, the lower of these plates, 23, lies beneath the sandwich of the sheets which is seated in place with the projecting pins 25 extending up through the selected row of perforations in the material. These pins extend through and above the material and their extensions are received in the perforations 26 formed in the upper guide plate 24. This aligns the side faces 27 and 28 of the plates 23 and 24 and when they are slidably engaged with the end face 29 of a sewing jig, generally indicated at 30, they provide for sewing to be effected along an exact straight line.

The sewing jig 30 is provided with a horizontal slot 31 extending inward into the body 32 thereof. This slot is of a width and depth to receive the portions of the strips 1 which extend outwardly beyond the faces 27 and 28 of the plates 23 and 24. The depth of the slot is somewhat greater than the outward extent of the strips so that the end edges 22 will not abut the bottom, or end, of the slot.

A vertically extending needle hole 33 is formed through the body 32 closely adjacent the face 29 for the reception of the sewing needle 34. The relationship of this hole with respect to the face 29 is such that when the extending portions of the strips 1 are properly seated in the slot 31, the aligned slits 20 will be substantially in the middle of the hole. Thus, as the material is slid along with the faces 27 and 28 in engagement with the face 29, while the needle 34 and bobbin 35 operate in the manner well known in the sewing art, the strips will be sewn together. The stitching 36 passes through the material remaining in back of each slit and through the faced slits themselves. When the major portions of the strips so sewn together are separated by hinging them open into a 180° angle about the stitched joint, the front face of the articulated sheet will be substantially in a flat plane with the joint being substantially unnoticeable.

Though it has been indicated that the strips with their guiding plates 24 and 25 are slid along with respect to the jig 30, and the jig is shown as being clamped down to a base by means of the screw 37, it is of course to be understood that the reverse could be true. In other words, the jig and sewing mechanism could be moved along against the faces 27 and 28 while the plates 23 and 24 are fixed.

A simplified sewing apparatus eliminating the guiding plates of Figures 4 and 5 is illustrated in Figures 6 and 7. Here, the two strips 1, whose edges have been accurately trimmed with respect to their slits 20, are brought together with their slitted faces engaging each other, but instead of employing guiding plates, a jig, generally shown at 38, is used. This jig has its working end 39 recessed at 40 to receive the aligned edges 22 of the strips 1. The end 39 has spaced horns 41 and 42 which overlie the top of the sandwich of strips and which receive between them the slotted pressure foot 43 of a suitable sewing machine. The slot 44 in this pressure foot is aligned with the slits 20 and both of these line up with a suitable underneath supporting plate 45.

The plate 45 is perforated at 46 to allow the needle 47 to travel down through it for cooperation with thread from the bobbin 50. The needle 47 passes through the backing of the laminated strips and through the slits 20, to sew the strips together. The plate 45 also serves to complete the confining of the material in the recess 22 of the jig 38. The jig 38 is shown as mounted on a suitable base by means of a knurled screw 49 and overlies the bobbin 50. Again, when the articulated sheet after the sewing is completed is turned about the sewn section through an angle of 180°, a larger substantially flat sheet appears without any noticeable line of joinder on the front face thereof.

A fragment of such sheet is shown for illustrative purposes in Figure 8. In that showing, the two strips or panel elements, each indicated by the reference character 1, are shown as having the portions 51 thereof beyond their slits turned downwardly and backwardly, while having the remaining end faces of the slitted outer laminations 3 abutted together, as shown at 52. This abutting relation is maintained by the sewing, as effected in Figures 4 and 7 and here indicated at 53. The resulting composite or articulated sheet, as seen in Figure 8, provides an outer flat surface which is substantially continuous without noticeable interruption at the joint between the strips.

A method and apparatus for slitting and trimming two panels at the same time is shown in Figures 9 and 10. Here, a base 55 is recessed to receive the lower elements of slitting and trimming jigs, generally indicated at 56 and 57. The lower block 58 forming part of the trimming jig 57, and received in one part of the recess, carries an upwardly extending aligning pin 59. The block is recessed downwardly at 60 to receive the lower end of the trimming knife 69. The upper part of the trimming jig 57 consists of two blocks 61 and 62. The block 61 is recessed at 63 to receive the locating pin 59 and is offset upwardly at 64 from its lower surface in order to receive the ends of the strip or panel elements 65 and 66 to be trimmed off by the trimming knife. The recess 64 is long enough to receive various extents of ends 67 and 68, without having them abut the end thereof.

The block 62 has a trimming knife 69 secured against the face 70 thereof by some suitable means, such as the screws 71. The block 61 is recessed at 72 to receive the head of the knife and heads of the screws 71, but has a forwardly extending portion below the screw heads to embrace the blade of the knife 69 between its secured position and its cutting position. The cutting edge 74 of the knife 69 trims off the edge portions 67 and 68 of the panel elements 65 and 66 and extends through them into the protecting slot 60.

The tapered pins 75 and 76, shown in dotted outline in Figure 10, accurately relate and tie together the block member 61, and the block member 62. Thus, since the pins 59 engage the apertures 63, the blocks 58, 61 and 62 will be accurately related and tied together. The pins 75 and 76 are longitudinally and vertically spaced so as to be clear of the operating parts of the trimming and slitting elements.

The undersurface 77 of the block 62 continues to the top of the recess 64. Opposed to it, between the strips 65 and 66, just in back of the trimming knife, is seen a backing and spacer member 78. The member 78 spaces the panel elements 65 and 66 apart and backs them up while their outer surfaces are being cut.

The lower element of the slitting jig 56 consists of a block 80 having longitudinally spaced rollers 81 seated in recesses in the upper surface thereof, which rollers extend slightly above the top surface of the block 80 and provide a roller mounting for the guide bars assembled with the strips being worked on. The right hand face of the block 80 has the lower slitting knife 82 suitably secured thereto by suitable screws 83. The block 58 is recessed to receive the head of the knife and the screw head. The blade of the knife 82 extends up between the opposed faces of the blocks 80 and 58 and is positioned so that its cutting edge merely cuts the lower lamination of the strip element 66.

A similar slitting knife 84 is similarly carried by the upper block 85 of the cutting jig 56 and is likewise positioned to have its edge merely cut through the upper lamination of the panel element 65. The spacing and backing member 78 extending between the panel strips at this slitting stage backs each of them up and assists in the accuracy of the cut. The upper block 85 carries a large roller 86 which roller extends down through the block to engage the upper surface of the upper guide bar. The left side of the upper block 85 terminates in a downwardly extending end 87 carrying an edge roller 88 for engagement with the back edge of the upper guide bar.

The blocks 62 and 85 are fixedly secured together by screws 89. These screws are longitudinally spaced with respect to the slitting blade 84 and the roller 86, and extending from the face 70 of the block 62 into the block 85.

The sandwich of the strips or panel elements 65 and 66 with the spacer strip 78 therebetween is held for accurate movement through the slitting and trimming jig, by means of a pair of elongated guide bars 90 and 93. The lower of these bars 90 carries a series of locating pins 91 which extend up through perforations of a preselected row in the panel members and in the spacer member 78 to terminate in recesses 92 in the upper guide bar 93. These guide bars preferably extend the full length of the strips and are of a width to fit closely between the edge rollers 88 and the opposed flanges 80' and 85' of the blocks 80 and 85. The sandwich of guide bars and strips is of sufficient height to ride on and between the lower rolls 81 and the upper roll 86, without any play. Where the sandwich of strips emerges from the guide bars, it is held in close slideable fit between the end faces of the flanges 80' and 85'. Thus, a pair of strips can have their edges accurately and quickly trimmed and be similarly slit through their outer laminations by being located between such a pair of guide plates and run through the jigs just described.

A mechanism and method for joining a pair of trimmed and slitted strips, such as 65 and 66, is shown in Figure 11. Here, the face relationship of the strips as shown in Figure 9 has been reversed so that the slitted outer laminations of the strips are now seated in face to face relationship. Also, the slits are aligned in opposition to each other as shown at 95. Such alignment is effected by generally lining up the trimmed edges of the strips and then securing the strips in exact aligned relationship by applying upper and lower guide bars 96 and 97 to the sandwich of the strips. These guide bars, like those shown at 90 and 93, extend the length of the panel elements and employ locating pins 98 extending through the sandwich into the bores 99 of the bar 96 to maintain an accurate alignment of the strips and their slits.

The sandwich of the strips and their guide bars 96 and 97 is arranged to be moved by a sewing station in accurate relation with respect thereto. This is effected by carrying the principal part of the sandwich on a table 100, which rides on pairs of series of rollers, 101 and 102, mounted in and extending above the base 103. The table 100 may, if desired, have wear resistant strips, 104 and 105, seated in the lower face thereof to engage the rollers. The guide bars 96 and 97 are held downwardly by upper engaging rollers 106, of which two or more may be employed, suitably longitudinally spaced adjacent the sewing stage. These rollers are carried on arms 107. The lower guide bar 97 is supported at the sewing position and the whole assembly of table, guide bars, and sandwich is driven by means of the large driving roller 108. This roller may have a knurled, or other suitable friction surface, in engagement with a complementary friction strip 109 secured to the bottom face of the guide bar 97.

Sidewise movement of the guide bars away from the needle is precluded by the engagement of the end face of the ledge 110 on the lower guide bar with vertically pivoted spaced rollers 111 mounted on a suitable base. This necessitates the provision of a space between the engaged edge of the ledge 110 and the opposite edge of the table 100. Such a space is provided and is bridged over to evenly support the sandwich of strips by an elongated plate 112, one end of which seats on the ledge 110 and the other end of which seats in a recess 113 in the table 100.

Movement of the guide bars 96 and 97 in a lateral direction opposite to that of the rollers 111 is precluded by the engagement thereof with the needle block 114. This block is formed of several members which separate the panel elements at a small angle commencing at the point where they are sewn together. The several members consist of an intermediate wedgelike element 115 and mated upper and lower elements 116 and 117. Each inclined face of the wedge shaped portion 115 is recessed with respect to its opposed inclined face of the elements 116 and 117 to sufficient extent to form a receiving slot for the extending edge of one of the strips. The slots extend slightly further than the end edge of each strip to allow for slight adjustment of the needle block 114 as a whole in and out, or from left to right, as seen in Figure 11. This adjustment is effected by means of the L-shaped member 118 whose tail 119 seats in the member 117. This tail is secured in place and the elements of the block are secured together by means of the screw 120, which also passes through the rectangular ends of the elements 115, 116 and 117. The upstanding head 118' of the member 118 threadedly receives an adjusting screw 121 which is rotatably mounted in a bearing member 122, but is precluded from longitudinal movement therein by means of the knurled nut 123 and the collar 124. Rotation of the adjusting screw 121 is imparted by means of the knurled knob 125.

The sewing needle 126 operates in a slot 127 which is formed by recessing the members 116 and 117 and bordering that recess by the right hand surface of the guide bars 96 and 97. That surface is preferably spaced slightly away from the opposed faces of the elements 116 and 117 bordering the recess to allow for adjustment of the needle block 114. As will be appreciated, extreme accuracy is required in sewing the panel elements together. The confining of the needle in a slot, such as 127, assures this, while leaving the way open for a fine adjustment of the position of the slot by means of the screw 121 as called for by the position of the slits 95. This apparatus then provides for the exact aligning, effective handling and rapid sewing of a pair of slitted strips.

The preferred form of our invention, which provides a method and apparatus for the aligned slitting and subsequent sewing together of a pair of strips or panel elements as a continuous operation, without requiring the exacting step of realigning the panel elements between the slitting and sewing operations, is illustrated in Figures 12 through 24. Figure 12 shows the general scheme of the operative parts of the complete apparatus, omitting detail for the purpose of clarification, such detail being shown in subsequent views. In Figures 13, 14 and 17, an elongated supporting platform is shown in cross-section at 130. This platform is suitably mounted on a frame 131. The platform 130 is of sufficient length to support the strips throughout the whole length thereof while the same are being fed along past the various slitting and sewing stations.

The sandwich of strips is actually carried on an elongated table 132, a lower guide plate 133, and a bridging plate 134. The latter bridges the gap between the opposed edge faces of the table 132 and the guide plate 133. The two strips making up the sandwich are here shown by dot-dash lines 135 and 136.

The table 132 is mounted for longitudinal rolling movement with respect to the platform 130 by means of longitudinal series of rollers 137 and 138 arranged in laterally spaced pairs and rotatably mounted with respect to the lower surface of the table 132 by means of brackets 139 and 140. Suitable roller, or ball bearing mountings, may be provided for the supporting rollers. The rollers ride on the upper surface of track members 141 which are held in aligned position by means of side brackets 142 and 143. These brackets may be either integral with, or separate from the track members 141. The rollers are guided on the track members by guiding strips 144 and 145 secured to the upper faces of the track members 141 and engaging the side faces of the rollers 137 and 138 to sufficient extent to prevent lateral movement thereof without interfering with their rolling action.

The rolling mounting of the lower guide plate 133 is generally effected by means of pairs of axially aligned rollers 146 and 147 mounted on an axle 148 which is journaled at its ends in U-shaped channel members 149 and 150. These channel members are seated with their channels opening outwardly and with their lower horizontal portions seated on the platform 130. It is, of course, to be understood that these channel members preferably extend throughout the full length of the platform 130 and, with exception of a special situation to be hereinafter described, have pairs of rollers, such as 146 and 147 mounted at spaced positions along their length. The upper horizontal extensions of the channel members have vertically pivoted horizontally rotating rollers 151 and 152 mounted above the upper surfaces thereof for engagement with the lateral edges of the lower guide member 133. These rollers serve to maintain the lower guide member in longitudinal aligned relationship. All of the rollers just described may, if desired, be mounted on suitable roller, or ball bearings. The lower guide member 133 is provided on its lower surface with a rack 153 which extends along the length thereof and is engaged by a suitable driving pinion, not shown.

The upper guide member 155 overlies the sandwich of strips where they lie upon the lower guide member and extends through the length of the sandwich as does the lower guide member. The upper guide member, however, is of less width than the lower, but has its lateral edge 156 in vertical alignment with the adjacent lateral edge 178 of the lower guide member. Exact alignment of the upper and lower guide members, and of the strips forming the sandwich between them, as best shown in Figure 14, is effected by means of pins 157 which extend upwardly from the lower guide member through perforations of a preselected row in each strip and into receiving perforations in the upper guide member. Also, the upper guide member is perforated for the reception of removable pins 158 which are finer than the pins 157 and thus effect the final accurate aligning of the guide plates and of the strips. These pins, of course, extend through the strips and into the lower guide member. From this it will be seen that the upper and lower guide members 155 and 133 are held in alignment with the strips of material between them and roll along on the rollers 146 and 147 past the stationary cutters and past the sewing head to be described hereinafter.

This apparatus and method provides for the slitting of the inner laminations of the strips or panel elements so that when they arrive at the sewing stage, they will both be slit with their slits in face to face aligned relation. The slitting of the strips is effected one at a time without disturbing their aligned relationship. The slitting of the lower panel element is effected first and by means of the slitting jig shown in detail in Figures 15 through 18.

First the portions of the panel elements which extend out beyond the lateral edge 156 of the guide plate 155 must be separated or spread apart to facilitate slitting. This separation is preferably effected by hand as the sandwich of the strips is brought up to the first slitting jig. Such separation consists of turning the beginning of the extending edge 160 of the panel element 135 upwardly at right angles (see Figure 17). The beginning of the portion 160 being turned up, all the following material will naturally turn up into that position as the sandwich of strips is rolled along past the jig.

A holddown device is provided at the slitting stations to assist in assuring uniformity and accuracy of slitting. This device, as shown in Figure 15, consists of a fairly heavy L-shaped rod 161, whose elongated vertically extending portion 162 is journaled in the upper and lower flanges 163 and 164 of the channel member 150. The portion, or leg, 162 extends through and below the flange 164 in a portion which receives a spring 165. That spring is confined between an end collar 166 and the undersurface of the flange 164, so urges the leg 162 downwardly. Downward movement of the portion 162 is limited by means of the collar 167 secured to the portion 162 above the flange 163 and tending to engage that flange.

The end of the member 161 opposed to the vertical leg 162 is formed into a short vertical leg 168, the end of which carries a horizontal pivot pin 169 extending transversely with respect to the guide bar 155, at the position where slitting of the lamination of the lower strip commences. The pin 169 carries a roller 170, preferably on a roller or ball bearing mounting. The roller 170 rides on top of the guide bar 155 between the edge 156 thereof and the line of pins 158, and presses down on the surface of the guide bar 156, thus exerting a downward holding pressure in response to the action of the spring 165 to position and steady the guide bars for the slitting operation. Though only one of these holddown devices is shown, it is to be understood that the same type of device would be employed at both slitting stations.

The slitting jig per se, for slitting the lamination of the lower strip or panel element is indicated generally at 175. This jig is mounted on and with respect to the upper face of the flange 163 of the channel element 150. The base part of the jig comprises an elongated carrier member 176 pivoted at 177 adjacent one of its ends to the flange 163, so that it may swing toward and away from the lateral edge 178 of the lower guide member 133. It is however resiliently urged toward and against that edge by means of a spring 179. That spring is seated at one end over a pin 180 extending outwardly from a recessed portion of the carrier member at the opposite end from its pivotal mounting. At its other end, the spring 179 is seated over a screw 181 carried by the L-shaped bracket 182.

The carrier member 176 has a tongue 183 extending outwardly from substantially the middle of its outer surface 184. This tongue serves to partially support and locate the generally H-shaped adjustable knife holder mounted on top of the carrier member. This knife holder has a knife supporting leg 185, a locating leg 186, and a center securing web 187 (see Figure 16). The leg 185 is recessed at 188 upwardly from its bottom surface, and inwardly from its knife supporting face 189 to provide a path for the passage of the extending edge of the lower strip. Thus, such extending edge is positioned as it passes the jig for the slitting knife 190 to act thereon.

The knife 190 is suitably secured to the face 189 by some means such as the screws 191, the knife blade being set at an angle so that the slitting is principally effected by one corner of the blade at 192. Room for the knife blade and the screws 191 is provided by a setting back of the face 189 with respect to the face 156, as shown in Figure 16. The knife as here shown is provided with a stiffening and reinforcing backing strip 193 of somewhat greater width than the blade. Thus, as shown in Figure 15, the face 189 may be recessed at 194 for the reception of a portion of the backing strip 193 should the tilt of the knife be such as to make that necessary.

It will, of course, be understood that extreme accuracy is required for the positioning of the knife both horizontally and vertically so that it will always cut along the same straight line and will cut to just the depth needed for the slitting of one lamination of the panel without noticeably affecting the backing therebehind. As already indicated, vertical and angular positioning of the knife blade for exact slitting is provided for by suitable holding means such as the screws 191 whose heads overlie the blade of the knife 190. Exact seating of the extending edge portion of the strip for slitting to the right depth is assured by several factors. In the first place, that edge portion rides across the upper surface of the carrier member 176. Upward movement of it is substantially precluded by the presence of the overlying surface 188. The knife blade itself adds the final touch for it functions to hold the strip down against the carrier member 176 as well as slitting the strip.

Accurate horizontal positioning of the knife 190 is effected by a combination of several instrumentalities. One feature of the positioning is provided by the leg 186 being recessed upwardly from its lower surface substantially intermediate its ends, for the close slidable reception of the tongue 183. Thus the leg 186 has, in effect, a pair of downwardly extending horns 195 and 196, as seen in Figure 15. These horns fit the tongue 183 well enough to preclude sideplay of the leg 186 with respect to the tongue.

Fine sliding movement needed while adjusting the knife holder 175, to set it in place for clamping is effected by means of the adjusting screw 197. This screw is received in the slot 198 in a plate 199, the lower portion of the plate 199 overlies and is secured to the end of the tongue 183 by some suitable means such as the screw 200. The upper portion of the plate 199, providing a slot 198, is offset outwardly with respect to the bottom portion thereof, so as to space it away from the adjacent face of the leg 186. The space thus provided is partially occupied by a washer 201 or collar non-rotatably secured to the screw 197 in spaced relation with respect to the head thereof. The underside of the screw head and the washer 201 embrace the opposed faces of the plate 199 adjacent the slot 198, as best seen in Figure 16. It will, accordingly, be apparent that turning of the screw 197 will serve to move the H-shaped knife support 175 toward and away from the plate 199.

Once the knife support is adjusted into desired position by means of the screw 197, it is clamped in place with respect to the carrier member 176 by means of a pair of clamping bolts 202. To enable the adjustment to be made, the shanks of the clamping bolts 202 are received in enlarged apertures 203 in the web 187, extend through the same, and screw into the carrier member 176. The heads of the bolts are, of course, large enough to overlie the upper surface of the web adjacent recesses 203 to effect the desired clamping action.

From the foregoing description of the construction of the lower strip slitting jig, it is believed that its operation will be fairly obvious. First, extending edges of the strips are fed into the jig with the extending edge of the upper one 135 turned up at 180° whence that edge will continue to stand up at 180° as it rides between the surface 156 and the face of the knife blade 190. The extending edge of the lower strip 136 will ride across and be supported by the upper surface of the carrier member 176 while its upper face is being slit through to the extent of one lamination or other desired depth. The carrier member 176 will always remain in alignment with respect to the surface 178, since it is held in contact therewith by means of the spring 179. The knife 190 is clamped to the knife support and the knife support in turn is clamped in desired position with respect to the carrier member 176. Hence, the cut, or slit, made by the knife will always maintain a definite parallel relationship with respect to the surface 156 and hence with respect to the pins 157 and 158 which locate the guide members 133 and 155.

The slitting jig for slitting the lamination of the upper panel element or strip is shown in detail in Figures 19, 20 and 21 and is generally indicated by the reference character 205. Like the jig 175, the jig 205 is based on a carrier member 206, one of whose ends 207 is pivotally mounted at 208 with respect to the upper surface of the flange 163 of the channel member 150. The member 206 is, however, spaced above the flange 163 so the pivotal mounting at 208 includes a spacer collar 209 of the exact height desired surrounding the pivot bolt. The other end 210 of the member 206 is provided on its under surface with a block 211 raising that end 210 above the flange 163 the same distance as is done by the collar 209 at the other end 207. The block 211 is slidable on the upper surface of the flange 163 and might, if desired, be mounted on that flange rather than on the member 206. The member 206 is accordingly free to swing about the pivot 208 under the impetus of the spring 212. This spring extends from the screw 213 carried by the upstanding part 214 of an L-shaped bracket applied to the under surface of the flange 163. The end 210 is recessed and provided with a pin 215 to receive the other end of the spring. The raising of the member 206 by the collar 209 and by the block 211 is such that through the combination of the pivotal action at 208 and the spring action at 212 the curved face 216 of the member 206 constantly rides against the edge face 156 of the upper guide bar 155.

In order that the lower lamination or other desired thickness of the extending portion of the upper strip 135 may be slitted, it is necessary that the underlying extending portion of the lower strip be moved out of the way. This is done by turning such extending portion downwards, as shown at 217 in Figure 20. Thus, the extending edge portion 160 of the upper strip travels past the under surface of the carrier member 206 in engagement with that surface and is thus presented in position for cutting, or slitting.

Since the slitting here is effected from beneath the extending edge of the strip, the slitting knife 218 must be mounted beneath the member 206. This calls for the removal of portions of the flange 163 and of the base of the channel member 150 at this position, as shown at 219. Such removal is necessary for the locating of the knife mounting block 220, as well as the knife 218, in desired position. The position of the knife mounting block 220 must necessarily be capable of adjustment for properly locating the cutting corner 221 of the knife 218. Such adjustment is effected by means of the elongated screw receiving slots 222 formed in and through the member 206 for receiving the clamping screws 223, screwed into the block 220. The enlarged heads of these screws overlie the upper surface of the member 206 alongside of the slots 222 so enable clamping of the block 220 in desired adjusted position underneath the member 206.

The knife 218 is held in desired position on the inner face of the block 220 by means of the overlying heads of the screws 224. The inner face of the block 220 is recessed at 225 to receive the thickened back or edge of cutter blade should it be necessary to tilt the blade up to put its edge into that position. The block 220 is also recessed, as shown at 226, in opposition to the under surface of the member 206 to provide a confiing and guiding channel for the edge portion 160 of the strip 135 to ride in. This channel generally confines the edge 160 while exact positioning of that edge portion against the undersurface of the member 206 is effected by the supporting action of the knife blade itself while slitting the strip to desired depth.

The operation of this jig, save for being in reversed position, is the same as that of the jig shown in Figures 15 through 18. The construction here is more simple, so it is believed that such operation will be obvious. It is, of course, to be understood that a holddown device, as shown in Figure 15, will be provided at the cutting location of the jig of Figures 19–21, but such has been omitted from the showing of the jig per se in the interest of clarity.

Figure 22 is a diagrammatic showing of a portion of the device as seen in Figure 12. This view illustrates the operative positions and relationship of the jigs 175 and 205 as they would appear when viewed from the back in Figure 12 and with the strips of screen material travelling from left to right. Here, an additional feature of the use of deflector blades is illustrated, as indicated at 230 and 231. The blade 230 serves for deflecting the edge 160 of the upper strip 135 upwardly so that the knife 190 can slit through the inner surface of the lower strip following which the blade 231 deflects the extending portion 217 downwardly so that the knife 218 can slit through the inner surface of the upper strip 160. These deflector elements, where employed may be merely in the form of a suitably curved strip of metal. As pointed out heretofore, such deflectors are not essential, since initial hand separation of the edges of the strips or panel elements as those elements are fed into the device will cause the separation to continue. This continuation is due to the confining action of the relatively narrow passage through which each hand deflected strip portion must pass between the side of the knife blade and the edge of the guide member opposite thereto. There is no chance of the edge portion following any path other than that into which it is set.

The sewing stage of the preferred form of the device is shown in detail in Figures 23 and 24. Here the positioning of the strips, or panel elements, and the guide member is indicated by dot-dash lines so that the solid line showing of the other features of the device of the sewing stage can be more readily seen. In Figure 23 the inner edges of the strips are indicated by the line 235, and the aligned edge faces 156 and 178 of the guide members 133 and 155 are shown at 156. The rear edge face of the guide member 155 is shown at 236 and the rear edge face of the guide member 133 is shown at 237.

At this stage of the Figure 12 apparatus the supporting channel members 149 and 150 are removed and replaced by a platelike supporting construction generally indicated at 238. This plate includes two forwardly extending portions 239 and 240 which are spaced apart at the sewing head. The space between these portions is bridged over by the straps 241 and 242, the first of which carries a horizontally pivoted roller at 243 and the second of which carries a pair of horizontally pivoted rollers 244. These rollers, as seen in Figure 24, engage and support the lower guide member 133 as it, carrying the strips 136 and 137, and the upper guide member 155, rides past the sewing head. The rollers 243 and 244 are suitably mounted on ball bearings or other anti-friction mountings and are secured in the downturned portions 245 and 246 of their respective straps.

At this stage of the complete apparatus it is important that the aligned edge faces 156 and 178 of the guide members be maintained continuously in contact with the opposed face 247 of the sewing head. The extending edges of the strips have already been slitted in definite relationship to the edge faces 156 and 178 by means of slitting knives mounted on spring loaded carriers. The same relationship must be maintained between the mechanism employed for sewing the panel elements together and the edge faces 156 and 178 if the needle is to sew through the slitted strips in the exact position required. Thus a spring urged engagement of the guide members with the locating face 247 of the sewing head is needed at the sewing position. Here the guide members are urged against the stationary sewing head instead of the reverse as in the case of jigs 175 and 205.

This is effected by a mechanism centering about the arm 248 which overlies the outer portions of the supporting plate 238 and fits between the upper surface thereof and the under surface of the strip 136. This location is shown in Figure 24. The arm 248 is pivoted to one extension of the plate 238 at 249 and extends across to a position beyond the opposed edge of the plate 238 to terminate in an extending end provided with an upstanding projection 250. The projection 250 serves to anchor one end of a cable, or other suitable member 251 whose other end is engaged with one end of a spring 252. A cable 253 extends from the other end of the spring 252 and is suitably secured to the machine frame with the spring 252 maintained under tension.

The spring loading, or tensioning, effect of the spring 252 is imparted to the guide members by means of a roller 254 which rides in an offset receiving recess in the arm 248 and is journaled in place there. The roller 254, as seen in Figure 24, extends laterally beyond the inner edge of the arm 248 and rides against the rear edge face 237 of the guide member 133. Thus the action of the spring 252 holds that guide member and the guide member 155 registered therewith in close following contact with the fact 247 as the guide members and the strips or panel elements pass by the sewing head. This assures the exact registry needed for sewing through the slits made by the cutters carried by the jigs 175 and 205 and prevents any sidewise movement which might occur due to freedom between the plate 133 and the guide rollers 151 and 152.

The sewing head makes provision for the angular separation of the panel elements at the exact position where the needle 255 engages the portions of the panel elements in back of the slits therein. This is desirable, since the slits, or cuts, in and of themselves have no thickness. By opening the slits up a little through bending the material in back of them the needle and thread can more readily pass and the sewing is expedited. This separation is effected by forming the sewing head of three pieces, consisting of an upper guide 256, a lower guide 257 and a separator 258. The separator has a wedge shaped separating nose 259 and the opposed inner faces of the guides 256 and 257 are formed with faces 260 and 261 parallel to those of the nose 259, but recessed away therefrom to a sufficient extent to enable the spread edge portions of the strips to slide therethrough. The guides and the separator are held together by suitable screws 262 and the needle hole 263 is located at a position where angular separation of the edges of the strips takes place.

Provision for removing the sewing head in order to get at the customary bobbin therebeneath is effected by means of the knurled clamping screw 264. This screw clamps the spreader 258 to an adjusting plate 265. Removal of the clamping screw 264 enables the head to be lifted up and replaced in exact position by engaging aligning pins 265' with suitable perforations in the spreader member.

From time to time it may be necessary to make some small adjustment in the position of the needle hole 263. This is carried out by moving the adjusting plate 265 to which the sewing head is clamped. The adjusting plate 265 is normally clamped to the base 266 by a pair of clamping bolts 267 whose shanks are smaller than the apertures 268 through which they project and which have washers lying beneath their heads. Thus adjustment to the extent permitted by the difference between bolt shank and aperture size may be effected when the bolts 267 are freed. The making of such adjustment, to the small extent available, is effected by means of a set screw 269 and a bolt 270 which are carried by a rib 271 upstanding from the base 266 and engaging a comparable upstanding rib 272 on the rear end of the adjusting plate 265. The set screw 269 abuts the face of the rib 272 so is effective to separate the ribs while the bolt 270 is threaded into the rib 272 and thus serves to draw the ribs together. Obviously, then, adjustment may be effected by the manipulation of the set screw 269, and the bolt 270.

It is believed that the operation of the sewing head will be fairly well apparent from the description of the structure thereof. To restate it briefly, it will be seen that as the guide members 133 and 155 with the sandwich of strips or panel elements between them are brought up to the position of the sewing head, the extending edges of the strips will be separated and fed into the inclined slots in the sewing head between the nose 259 and the surfaces 260 and 261. The extending edges of the strips merely slide through these slots as the guide members are rolled past on the rollers 243 and 244. Once the apparatus has been set up properly and any needed adjustment of the sewing head has been made, the needle hole 263 will come exactly at the position of separation of the extending edge portions of the strips. Thus, as the sandwich of strips is fed by the sewing head at the proper speed, the desired stitching of the strips together will be effected by the action of the needle 255 and the threads provided by it and by the bobbin underneath.

The actual drive for feeding the guide members and strips through this stage, as well as through the other stages of the apparatus, may be of any suitable type, though it is here indicated as of a positive rack and pinion type. The rack bar is merely provided on the underface of the guide member 133 and extends along the length thereof, as indicated at 153 in the various figures. The pinion is not shown here because it is believed to be well understood how such a simple drive arrangement operates. Preferably, the pinion should be adjacent the sewing head, so that the uniform motion provided by the rack and pinion device will be at its most positive state, right at the sewing head, where the relationship of the passes made by the needle to the travel of the panel element is, of course, of importance.

Certain additional changes in carrying out the above method and in the constructions set forth which embody the invention may be made without departing from the scope thereof. It is thus intended that all matter contained in the above description, or shown in the accompanying drawing, shall be interpreted as illustrative and not in a limiting sense.

Having described our invention, what we claim as new and desire to secure by Letters Patent is:

1. The method of preparing strips of sheet material for joining together along a single line which comprises, placing two of said strips together in face to face relation and serving a portion only of the thickness of each of said strips along a single line in predetermined relationship with respect to a common reference line.

2. The method of preparing strips of sheet material for joining together which comprises, registering two strips of said material together in face to face relation and in fixed position with respect to each other and severing a portion only of the thickness of each of said strips along a single line in fixed relation with respect to a common reference line.

3. The method of preparing strips of sheet material for joining together which comprises, placing and holding two strips of said material together in face to face relation, trimming the edges of said strips with respect to a common reference line and serving a portion only of the thickness of each of said strips along a single line at a fixed distance from said trimmed edge.

4. The method of preparing strips of sheet material, formed of adhered multiple layers for joining together which comprises, placing two strips of said material together in face to face relation, trimming the edges of said strips with respect to a common reference line and severing an outer layer of each of said strips while leaving a layer unsevered along a line at a fixed distance from said trimmed edge.

5. The method of preparing strips of sheet material for joining together which comprises, placing two strips of said material in opposed face to face relation and forming a slit part way only through the body of one of said strips extending into said body from the inner opposed face thereof.

6. These steps in the method of preparing strips of sheet material for joining together which comprises, mounting two strips of said material in face to face relation, forming a slit, with respect to a fixed reference line, part way only through the body of one of said strips extending into said body from the inner face thereof and similarly slitting the other of said strips with respect to said same reference line.

7. The method of preparing strips of sheet material for joining together which comprises, mounting a pair of strips of said material in face to face relation, exposing portions of the opposed faces of each of said strips by separating one of said strips from the other thereof and slitting part way only through the thickness of one of said strips at said exposed position from the opposed face thereof inward.

8. The method of preparing strips of sheet material having a finished face layer adhered to a backing layer for joining together which comprises, placing a pair of elongated strips of said material with the finished faces thereof in face to face relation, separating edge portions of each of said strips from each other, introducing a slitting member through said finished face layer only of one of said strips for a predetermined distance into the body thereof at said separated position, and effecting straight line relative movement between said one strip and said slitting member to slit said one strip throughout the length thereof leaving said backing layer unslitted.

9. The method of registering slits in the faces of elongated strips of sheet material, each of which strips is formed with the same perforation pattern therein and each of which is slitted in the same relation with respect to said perforation pattern which comprises, mounting said strips with their slit faces in face to face relation, adjusting said strips so that said slits substantially coincide and completing the registry of said slits by lining up a set of perforations in one of said strips with a similar set in the other of said strips.

10. The method of slitting the face layers of elongated strips of sheet material formed with face layers adhered to backing layers and of registering said slits with the slit faces thereof in opposition which comprises, simultaneously slitting through the face only of each strip and trimming the adjacent edge thereof with the slit and edge at a fixed distance apart, mounting the strips together in face to face relation with said slits obscured, and locating said slits in exact opposition by exactly aligning the trimmed edges of said strips.

11. The method of slitting the face layers of elongated strips of sheet material formed with face layers adhered to backing layers which comprises, mounting a pair of strips of such material together in face to face relation, aligning said strips, securing said strips in alignment throughout their length and forming slits through said face layer only of each of said strips in common relationship with respect to a fixed reference line.

12. The method of slitting the opposed faces of elongated strips of sheet material formed with a face layer adhered to a backing layer and of registering said slits which comprises, mounting a pair of strips of said material together in face to face relation, aligning said strips, securing said strips in alignment throughout their lengths with the edge portions thereof free for bending movement away from each other, separating said edge portions by bending one with respect to the other, and forming a slit through the face layer only of each of said edge portions in the same spaced relation with respect to a common reference line.

13. The method of slitting the opposed faces of elongated strips of sheet material formed with a face layer adhered to a backing layer and of registering said slits, said strips being formed with uniform perforation patterns therein which comprises, mounting the strips in face to face relation, exactly aligning the strips by passing aligning members through the perforations in each strip and into engagement with a reference member, and slitting each of said strips from its inner face outwardly for a portion of its thickness with respect to a common line throughout the length thereof while leaving said backing layer unslitted.

14. In apparatus of the character described, a pair of guide members, means to register said guide members with respect to each other with a piece of sheet material therebetween, a cutter mounting member formed with means for mounting a cutter blade thereon and mounted solely on one of said guide members in slidable relationship longitudinally thereof and interengaging means between said cutter mounting member and said one guide member for preventing lateral movement of said cutter mounting member with respect to said one guide member, said interengaging means including laterally extending portions on said cutter mounting member engaging the opposite edge faces of said one guide member, one of said laterally extending portions comprising a vertically pivoted roller.

15. In apparatus of the character described, a pair of elongated guide bars for the securing of sheet like material therebetween, means to register said bars and said sheet material therebetween, a pair of cutter mounting members, means formed on each of said cutter mounting members to receive one of said guide bars for laterally restricted longitudinal movement between said guide bars and said cutter mounting members and means formed on said cutter mounting members for mounting cutting knives extending in opposition with respect to each other.

16. In apparatus of the character described, a pair of elonagted guide bars for the securing of sheet like material therebetween, means to register said bars and said sheet material therebetween, a pair of cutter mounting members, means formed on each of said cutter mounting members to receive one of said guide bars for laterally restricted free longitudinal movement between said guide bars and said cutter mounting members, means formed on said cutter mounting members for mounting cutting knives extending in opposition with respect to each other and means formed on one of said cutter mounting members for mounting a third cutting knife in parallel spaced relation with respect to said opposed cutting knives.

17. In apparatus of the character described, means for cutting into the body of a strip of material through one face thereof, means for limiting the depth of such cut to less than the thickness of the material, means operable in conjunction with said cutting means for registering a sheet of material with respect to said cutting means, means for effecting relative movement between said registering means and said cutting means for extending said cut into a slit in said material, and means, including said relative movement effecting means, for presenting a pair of strips of material so cut in position to be secured together and means acting in alignment with said slits to sew said strips together.

18. In apparatus of the character described, means for holding a pair of strips of laminated sheet material together with edge portions thereof extending free, means for cutting through one lamination of one of said edge portions throughout the length thereof and for leaving another lamination thereof uncut, means for similarly cutting the other of said edge portions, means for registering said strips with the cuts in said edge portions aligned and with the cut faces of said strips in opposition, means for presenting said strips so registered in sewing position and means for sewing said strips together by passing a thread through said cuts and through the material in back of and in alignment with each of said cuts.

19. In apparatus of the character described, a support, an elongated carriage movably mounted with respect to said support, a pair of guide plates forming part of said carriage and extending along one side thereof, the outer edge faces of said guide plates being in alignment and forming a guiding surface, a follower member movably mounted on said support and having a portion in engagement with said guiding surface, resilient means to maintain said follower member in contact with said guiding surface, a cutter, and means for mounting said cutter in fixed position with respect to said follower with the cutting edge thereof in closely spaced relation with respect to said guiding surface.

20. In apparatus of the character described, a support, an elongated carriage movably mounted with respect to said support, a pair of guide plates forming part of said carriage and extending along one side thereof, the outer edge faces of said guide plates being alignment and forming a guiding surface, a follower member movably mounted on said support and having a portion in engagement with said guiding surface, resilient means to maintain said follower member in contact with said guiding surface, a cutter, and means for mounting said cutter on said follower with the cutting edge thereof lying alongside of and in closely spaced relation with respect to said guiding surface, said last named means including means to adjust the position of said cutter on said follower and means to clamp said cutter in adjusted position.

21. In apparatus of the character described, a support, a pair of guide members in the form of elongated strips mounted in overlying relation on said support, means extending from one of said guide members and receivable in the other to maintain the same in overlying relation, a cutter mounting member formed with means for the adjustable mounting of a cutter blade thereon, said cutter mounting member being carried by said support and having a portion positioned at one side of said guide members, one of said guide members being formed with a guiding side face thereon extending therealong and said portion of said cutter mounting member having a part formed to slidably engage said guiding face and means maintaining said face and said part in engagement as said guide member and said mounting member are moved with respect to each other.

22. In apparatus of the character described, a support, a pair of guide members in the form of elongated strips mounted in overlying relation carried by said support, means extending through one of said guide members and receivable in the other to maintain said guide members in said overlying relation, a cutter mounting member formed with means for the adjustable mounting of a cutter blade thereon, said cutter mounting member being carried on said support at one side of said guide members, one of said guide members at said one side being formed with a guiding face extending therealong, means on said cutter mounting member to slidably engage said face and means acting on said cutter mounting member to maintain said engagement as said guide members and said mounting member are moved with respect to each other, whereby a knife blade held by said holding means will describe a fixed path with respect to said guiding face during said movement.

23. In apparatus for accurately positioning an elongated strip of sheet material for cutting a slit therein along the length thereof, a support, a carrier for sheet material mounted on said support and for movement along the same, said carrier being formed with an elongated guide plate along one longitudinal edge thereof, and said guide plate being formed with a guiding side face along the longitudinal side thereof, said guide plate being formed to retain an edge portion of a strip of material carried by said carrier in fixed position, a cutter mounting member mounted at a fixed position on said support in opposed relation with respect to said guiding edge face and for movement toward and away from said guiding side face, means for mounting a cutter on said cutter mounting member on the side thereof towards said side face, said cutter mounting member being formed with an engaging surface for engaging said side face and means acting on said cutter mounting member to maintain said engaging surface in contact with said side face during the movement of said carriage with respect to said cutter mounting member.

24. In apparatus for accurately positioning an elongated strip of sheet material for cutting a slit therein along the length thereof, a support, a carrier for sheet material mounted on said support and for movement along the same, said carrier being formed with a pair of elongated plate-like members along one longitudinal edge thereof, one of said members being formed with a guiding side face along the longitudinal side thereof, means to maintain said plate-like members in alignment with an edge portion of a strip of material carried by said carrier in fixed position therebetween, a cutter mounting member mounted at a fixed position on said support in opposed relation with respect to said guiding side face and for movement toward and away from said guiding side face, means for mounting a cutter on said cutter mounting member on the side thereof toward said side face, said cuter mounting member being formed with an engaging surface for engaging said side face and means acting on said cutter mounting member to maintain said engaging surface in contact with said side face during the movement of said carriage with respect to said cutter mounting member.

25. In apparatus for accurately positioning an elongated strip of sheet material for cutting a slit therein along the length thereof, a support, a carrier for sheet material mounted on said support and for movement along the same, said carrier being formed with a pair of elongated plate-like members along one longitudinal edge thereof, one of said members being formed with a guiding side face along the longitudinal side thereof, pins extending through one of said members and into the other thereof to maintain said plate-like members in alignment with an edge portion of a strip of material carried by said carrier in fixed position therebetween, a cutter mounting member mounted at a fixed position on said support in opposed relation with respect to said guiding side face and for movement toward and away from said guiding side face, a cutter blade mounted on said cutter mounting member on the side thereof toward said mounting side face, said cutter mounting member being formed with an engaging surface for engaging said side face and means acting on said cutter mounting member to maintain said engaging surface in contact with said side face during the movement of said carriage with respect to said cutter mounting member.

26. In apparatus for the securing together of elongated strips of sheet material, a support, an elongated carriage for said strips of material, means for mounting said carriage for movement longitudinally on said support, an elongated guide bar forming a longitudinal edge of said carriage, said guide bar being formed with a guiding face on the outer side thereof extending therealong in the direction of movement of said carrier and means carried by said guide bar for holding an edge portion of a strip of material in fixed position along the length of said bar with a portion of said material extending outwardly beyond said guiding face, a sewing head mounted on said support alongside of said guiding face and in fixed longitudinal position with respect thereto, and resilient means mounted on said support and acting on said guide bar at a position opposite to said sewing head to retain said guiding face of said guide bar in uniform engagement with said sewing head as said carriage is moved past said sewing head.

27. In apparatus for preparing elongated strips of sheet material for securing together, a support, an elongated carriage for said strips of material, means for mounting said carriage for movement longitudinally on said support, a pair of elongated guide bars mounted in overlying relation, extending along one longitudinal edge of said carriage and forming part thereof, one of said guide bars being formed with a guiding face on the outer side thereof and extending in the direction of movement of said carrier along the length thereof, means carried by one of said guide bars and extending into the other thereof for holding edge portions of said strip of material in fixed position therealong with a part of said edge portions extending out beyond said guiding face, cutter members mounted on said support alongside of said guiding edge face and in fixed longitudinal position with respect thereto for engagement with said extending parts of said edge portions, and hold down means mounted on said support and acting on the upper of said guide bars at positions opposite to said cutter members to maintain said edge portions tightly clamped between said guide bars, said hold down means including a shank secured to said support, an arm extending from said shank and engaging the upper surface of said upper guide bar, and resilient means to hold said arm down on said upper surface.

28. In apparatus for preparing elongated strips of sheet material for sewing together and for effecting such sewing, a support, an elongated carriage for such strips of material, means for mounting said carriage on said support for longitudinal movement thereon, a pair of locating bars forming part of said carriage and extending along one longitudinal edge thereof, one of said locating bars being formed with a guiding side face thereon, means to maintain said bars in aligned relation and to position an edge of sections of sheet material therebetween, a pair of cutter mounting members mounted on said support at fixed longitudinal positions thereon in opposed relation with respect to said guiding side face and for movement toward and away from said guiding side face, said cutter mounting members being formed with engaging surfaces for engaging said guiding side face, resilient means acting between said support and said cutter mounting members for maintaining said surfaces and said guiding side face in uniform engagement as longitudinal movement of said carriage is effected, cutter blades mounted on said cutter mounting members on the side thereof adjacent said guiding face, the cutter blade on one of said mounting members being directed downwardly and the cutter blade on the other of said mounting members being directed upwardly, a sewing head carried by said support and fixedly mounted thereon at a position spaced along the longitudinal movement of said carriage from said cutter mounting members, a roller mounted on a vertical axis and having its surface in engagement with the surface of one of said guide bars in opposition to said guiding side face, and in opposition to said sewing head, mounting means for mounting said roller for movement towards and away from said sewing head and resilient means for urging said roller towards said sewing head whereby all sidewise play will be taken out of the movement of said carriage as said carriage passes said sewing head.

References Cited in the file of this patent

UNITED STATES PATENTS

| Number | Name | Date |
|---|---|---|
| 11,581 | Shaw | Aug. 22, 1854 |
| 160,613 | O'Brien | Mar. 9, 1875 |
| 179,645 | Cassidy | July 11, 1876 |
| 1,211,777 | Stanfield | Jan. 9, 1917 |
| 1,646,129 | Wagner | Oct. 18, 1927 |
| 1,768,025 | Berger | June 24, 1930 |
| 1,856,739 | Alt et al. | May 3, 1932 |
| 1,956,275 | Cook | Apr. 24, 1934 |
| 1,991,698 | Powers | Feb. 19, 1935 |
| 2,028,005 | Nissen | Jan. 14, 1936 |
| 2,059,873 | Jones et al. | Nov. 3, 1936 |
| 2,182,911 | Bowman | Dec. 12, 1939 |
| 2,413,544 | Carpenter | Dec. 31, 1946 |
| 2,432,545 | Sigoda | Dec. 16, 1947 |
| 2,475,759 | Seaman | July 12, 1949 |
| 2,572,170 | Matter | Oct. 23, 1951 |
| 2,611,179 | Butler | Sept. 23, 1952 |
| 2,642,020 | Breul | June 16, 1953 |